(12) United States Patent
Hacikyan

(10) Patent No.: US 8,540,137 B1
(45) Date of Patent: Sep. 24, 2013

(54) ADHESIVELESS WELDING PURGE DAM

(76) Inventor: Michael Hacikyan, Amherst, NY (US)

( * ) Notice: Subject to any disclaimer, the term of this patent is extended or adjusted under 35 U.S.C. 154(b) by 0 days.

(21) Appl. No.: 13/562,496

(22) Filed: Jul. 31, 2012

(51) Int. Cl.
*B23K 31/12* (2006.01)
*B32B 29/00* (2006.01)

(52) U.S. Cl.
USPC ............. 228/219; 228/42; 228/60; 428/84; 428/192

(58) Field of Classification Search
None
See application file for complete search history.

(56) References Cited

U.S. PATENT DOCUMENTS

| | | | |
|---|---|---|---|
| 3,338,499 A * | 8/1967 | Gilbert | 228/57 |
| 3,736,400 A * | 5/1973 | Spiegel et al. | 219/60 A |
| 4,096,372 A | 6/1978 | Hallenbeck | |
| 4,114,655 A * | 9/1978 | Bloker | 138/89 |
| 4,415,114 A | 11/1983 | Hallenbeck | |
| 4,674,772 A * | 6/1987 | Lycan | 285/22 |
| 4,916,281 A | 4/1990 | Flasche et al. | |
| 5,100,043 A | 3/1992 | Hallenbeck | |
| 5,187,343 A | 2/1993 | Edwards | |
| 5,361,972 A * | 11/1994 | Barker | 228/219 |
| 5,390,846 A | 2/1995 | Thode | |
| 5,583,305 A | 12/1996 | Hirsch et al. | |
| 5,669,547 A | 9/1997 | Spring | |
| 5,785,235 A * | 7/1998 | Beatty | 228/42 |
| 6,299,607 B1 * | 10/2001 | Osborn et al. | 604/385.02 |
| 7,112,258 B2 * | 9/2006 | Klerelid et al. | 162/109 |
| 7,112,358 B1 | 9/2006 | Hacikyan | |
| 7,632,556 B1 * | 12/2009 | Hacikyan | 428/40.1 |
| 8,061,388 B1 * | 11/2011 | O'Brien et al. | 138/89 |
| 8,292,161 B2 * | 10/2012 | Hacikyan | 228/212 |
| 2004/0022676 A1 | 2/2004 | Hamilton et al. | |
| 2005/0072809 A1 | 4/2005 | Pantelleria et al. | |
| 2006/0068142 A1 * | 3/2006 | Hacikyan | 428/40.1 |
| 2008/0251132 A1 | 10/2008 | Bentley et al. | |
| 2011/0151166 A1 * | 6/2011 | Hacikyan | 428/40.1 |

FOREIGN PATENT DOCUMENTS

| | | | |
|---|---|---|---|
| JP | 05-245633 A | * | 9/1993 |
| JP | 06-23685 | | 3/1994 |
| JP | 09-010933 A | * | 1/1997 |
| JP | 2003-266176 A | * | 9/2003 |
| JP | 2010-149164 A | * | 7/2010 |
| KR | 20-0159923 | | 11/1999 |
| KR | 20-0179895 | | 4/2000 |

OTHER PUBLICATIONS

Arczone.com, "Purge Bladders Save Time and Money", 2006, 2 pages.
Weldwide Solutions, "Tandem Ring Purge System", at least as early as Apr. 27, 2012, 3 pages.
Huntingdon Fusion Technologies Limited, "ARGWELD Inflatable Pipe Purging System", Jan. 12, 2008, 2 pages.

(Continued)

*Primary Examiner* — Kiley Stoner
(74) *Attorney, Agent, or Firm* — Walter W. Duft

(57) ABSTRACT

A water-degradable welding purge dam for purging a weld zone of a pipe assembly comprising first and second pipes having respective first and second ends to be welded together at a root gap. The purge dam includes a blocking plate comprising one or more plate members. The one or more plate members include a friction plate member having a plurality of flexible members on its periphery adapted to flexibly engage an inside wall of one of the first or second pipe ends in a self-retaining manner. The purge dam comprises one or more water degradable materials so that it can be flushed from the pipe assembly following welding.

13 Claims, 2 Drawing Sheets

(56) References Cited

OTHER PUBLICATIONS

Huntingdon Fusion Technologies Limited, "ARGWELD Single Exhaust Pipe Weld Purging Systems 2-6 Inch Pipework", Mar. 15, 2011, 2 pages.

Sumner Manufacturing Co., Inc., "Inflatable Weld Purge System", at least as early as Apr. 27, 2012, 2 pages.

Weldwide Solutions, "Inflatable Purge Systems", at least as early as Jan 16, 2012, 4 pages.

Safety Main Stopper Co., Inc., "Inflatable Purge Dams", at least as early as Jan. 16, 2012, 2 pages.

Aquasol Corporation, "Purge Bladder: I-Purge Inflatable Purge Dam System", 2010, 6 pages.

AB Paper Co., "Shur-Purge", Jan. 1, 1997, 5 pages.

Intercon, "Water-Soluble Purge Paper", Oct. 1, 2002, 5 pages.

Gilbreth, "Dissolvo", 2001, 8 pages.

\* cited by examiner

ADHESIVELESS WELDING PURGE DAM

BACKGROUND

1. Field

The present disclosure relates generally to inert gas welding. More particularly, the invention is directed to purge dams for retaining purge gas around a weld zone.

2. Description of the Prior Art

By way of background, inert gas welding is a species of arc welding in which the molten weld pool is shielded from atmospheric contamination and oxidation by bathing it with an inert gas, such as Argon, or a mixture of Helium and Argon. Popular examples of inert gas welding include TIG (Tungsten Inert Gas) welding and MIG (Metal Inert Gas) welding.

When welding together pipes and other enclosed structures using inert gas welding, it is important to purge the interior of the pipe or structure in the vicinity of the weld zone to prevent corrosion and the formation of oxides on the interior side of the weld pool. Purge dams are conventionally used for this purpose. For example, when butt-welding the ends of two pipe sections to form a consolidated pipe run, two purge dam structures are placed in the pipes, one in each pipe end on either side of the weld zone. A purge gas can then be introduced into the area between the purge dams.

Water degradable purge dams have been proposed that are made from water degradable paper. The advantage of water degradable paper purge dams is that they can be placed in close proximity to a weld zone, and then removed following welding by dissolving or otherwise degrading them with water introduced through the pipe. Insofar as pipe systems typically undergo hydrostatic pressure testing or flushing with water prior to use, water degradable purge dams can be used in many cases without any additional processing steps following welding. Such purge dams are typically formed from a sheet of water soluble paper that is formed into a concave shape in which a central portion of the purge dam spans across the diameter to the pipe to be welded and a peripheral edge portion of the purge dam engages the pipe wall so that it can be secured thereto, such as by applying a water degradable adhesive tape or glue at the installation site, or by pre-applying such an adhesive material during manufacture of the purge dam.

Applicant submits that there is presently a need for improvement in the construction of water-degradable purge dams. What is required in particular is a purge dam apparatus that can be installed in a pipe or other structure to be welded, and retained therein without the use of adhesives.

SUMMARY

A water-degradable welding purge dam is provided for purging a weld zone of a pipe assembly that comprises first and second pipes having respective first and second ends to be welded together at a root gap. The purge dam includes a blocking plate comprising one or more plate members. The one or more plate members include a friction plate member having a plurality of flexible members on its periphery adapted to flexibly engage an inside wall of one of the first or second pipe ends, such that the purge dam is self-retaining in the pipe assembly. The purge dam comprises one or more water degradable materials so that it can be flushed from the pipe assembly following welding.

In an embodiment, the flexible members may comprise flexible tabs defined by slits in the friction plate member periphery. The one or more plate members may additionally include one or more support plate members that support the friction plate member. The one or more support plate members may have a periphery that is aligned with a base of the friction disk flexible tabs. The purge dam may be substantially flat and the one or more plate members may each comprise a generally circular disk. The one or more plate members may each comprise one or more layers of the one or more water degradable materials. The one or more water degradable materials may comprise water soluble paper, a water degradable polymer, or a combination of water soluble paper and a water degradable polymer.

In another aspect, a method for installing the purge dam, and a weld zone purging installation comprising a pair of the purge dams installed in a pipe assembly, are provided.

The foregoing and other features and advantages will be apparent from the following more particular description of example embodiments, as illustrated in the accompanying Drawings, in which:

DETAILED DESCRIPTION OF EXAMPLE EMBODIMENTS

Figure 1:
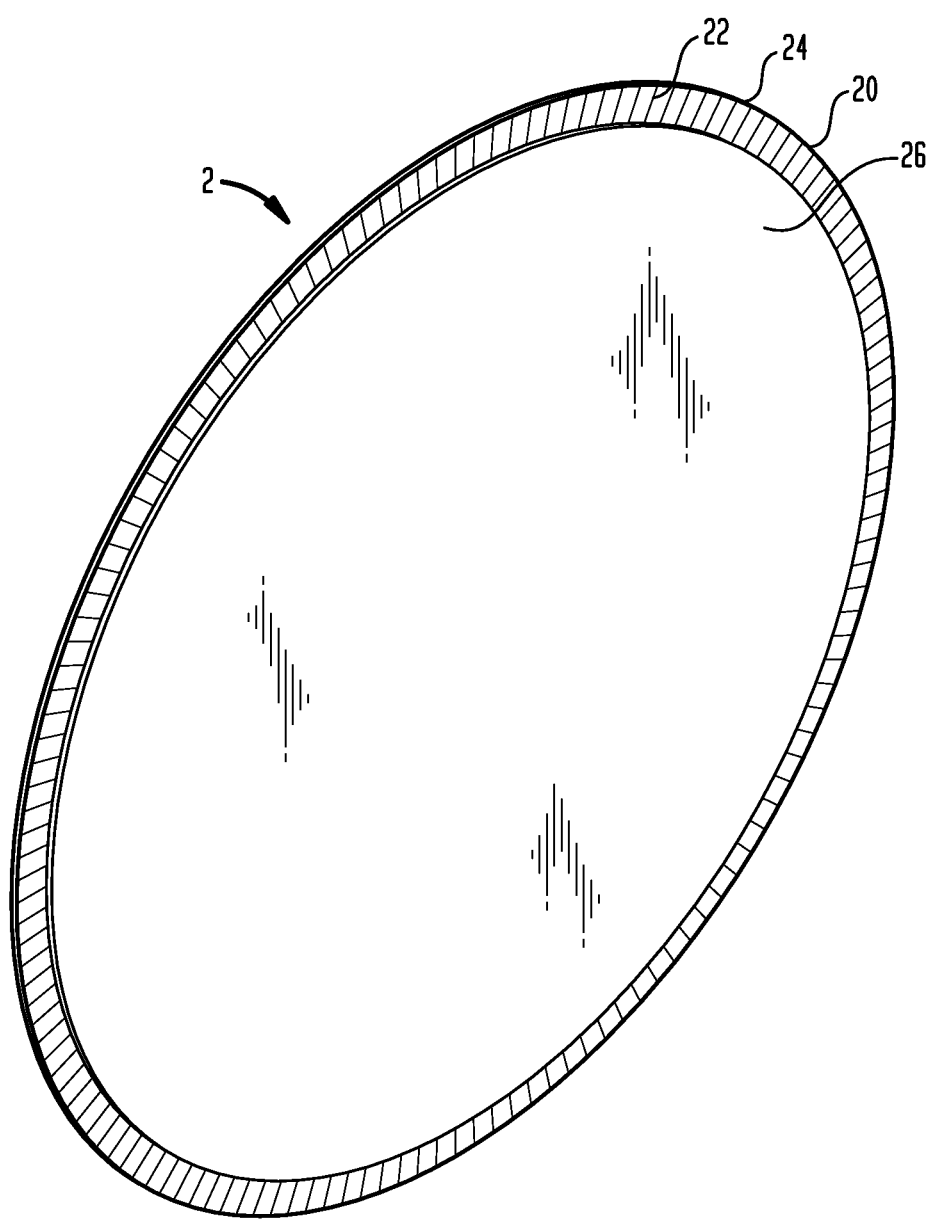
FIG. 1 is a perspective showing a water-degradable purge dam constructed in accordance with an embodiment with the present disclosure.
Figure 2:
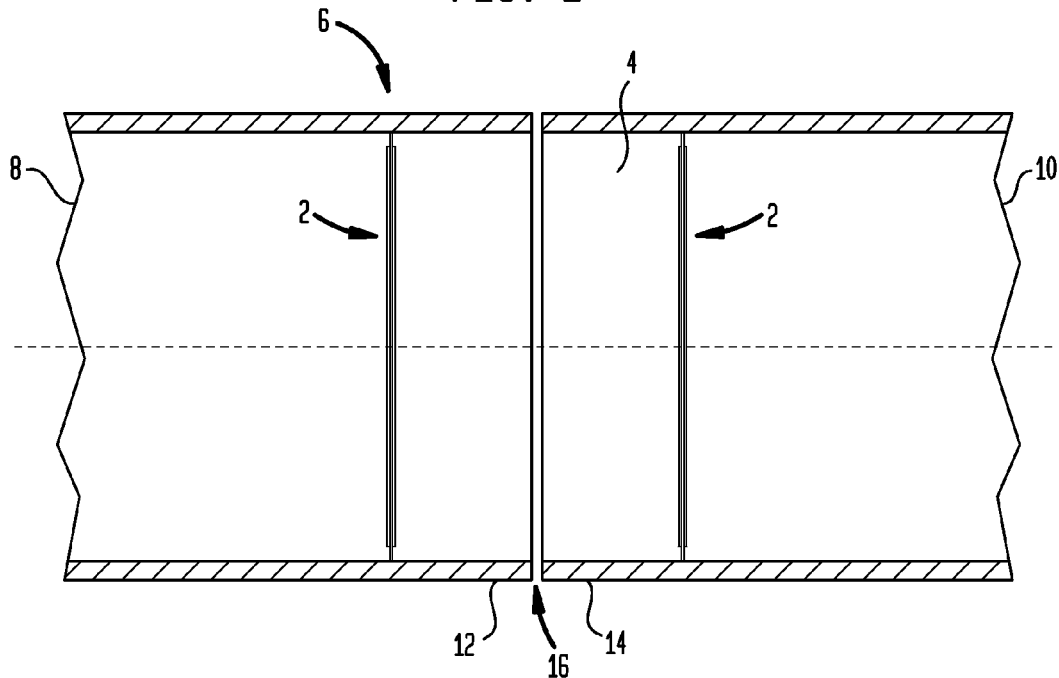
FIG. 2 is a cross-sectional centerline view of a pipe assembly in which two of the purge dams of FIG. 1 have been installed.

Turning now to the drawing figures, which are not necessarily to scale, like reference numbers are used to represent like elements in all of the several views. FIG. 1 illustrates an example water-degradable purge dam 2 representing one possible embodiment of the disclosed subject matter. FIG. 2 shows a pair of the purge dams 2 installed for purging a weld zone 4 of a pipe assembly 6 that comprises a first left-side pipe 8 and second right-side pipe 10. The first and second pipes 8 and 10 have respective first and second pipe ends 12 and 14 to be butt-welded together at a root gap 16. All structural components of the purge dam 2 are made from water degradable materials. A variety of water degradable materials may be used, either alone or in combination. The selected water degradable material(s) will be preferably designed to (1) provide low (or zero) air permeability for critical welding applications, (2) provide sufficient strength to withstand both purge gas pressure and air flow pressures within the pipes 8 and 10, (3) allow the purge dams to be easily formed and manipulated from flat sheet stock into their final shapes, and (4) degrade under hydrostatic pressure testing or flushing of the pipe structure with water or other aqueous liquids to facilitate purge dam removal following welding.

Example water degradable materials include, but are not limited to, water degradable paper or board, a water degradable polymer, or a combination of water degradable paper or board and a water degradable polymer. Suitable water degradable paper and board materials are available from Aquasol Corporation of North Tonawanda, N.Y. under the trademark Aquasol®. The Aquasol® brand paper and board products are water soluble and made of Sodium Carboxy Methyl cellulose and wooden pulp that dissolves rapidly and completely in most liquids, including water. A suitable water degradable polymer is polyvinyl alcohol (PVOH), which may be manufactured in film form or as a molded three-dimensional structure. Regardless of whether the water degradable material is paper, board, polymer, or a combination of such materials, one or more layers of the selected material may be fabricated into water degradable sheets of varying thickness. The sheet thicknesses may be selected according to the strength and flexibility requirements of the various structural components of the purge dam 2. The water degradable sheets may cut into any desired shape that is useful for purge dam formation. A suitable water degradable adhesive may be used to combine the structural components of the purge dam apparatus 2.

Figure 3:
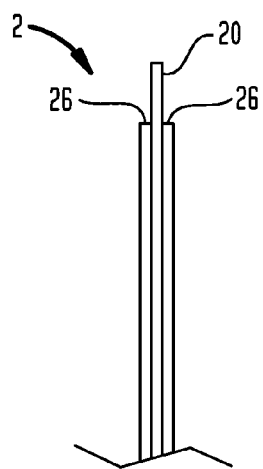
FIG. 3 is an enlarged fragmentary side view showing example structural features of the purge dam of FIG. 1.

As can seen in FIGS. 1 and 2, the purge dam 2 is formed as a substantially flat blocking plate comprising one or more plate members. With additional reference to FIG. 3, the one or more plate members include a friction plate member 20 having a plurality of flexible members 22 on its periphery 24. The flexible members 22 are adapted to flexibly engage an inside wall of one of the first or second pipe ends 12 and 14, such that the purge dam 2 is self-retaining in the pipe assembly 6. As used herein, the term "self-retaining" refers to the fact that no external retention components or materials, such as adhesive tape, glue, fasteners, etc., are required to retain the purge dam 2 in engagement with the pipe end inside walls. The desired self-retention property of the purge dam 2 is due to two factors. First, the diameter of the friction plate is somewhat larger than the inside diameter of the pipe ends 12 and 14. This forces the free ends of the flexible members 22 to bend when the purge dam 2 is installed. Second, the flexible members 22, as well as the remainder of the friction plate 12, are sufficiently stiff to develop radial forces between the flexible members 22 and the pipe end inside walls as the flexible members bend during purge dam installation. These radial forces in turn create longitudinal friction forces along the pipe end inside walls that oppose air or purge gas pressures that might otherwise displace the purge dam 2 in the longitudinal direction within the pipe ends 12 and 14. In the illustrated embodiment of FIGS. 1-3, the flexible members comprise flexible finger-shaped tabs defined by slits in the friction plate member periphery 24. The slits may be formed using any suitable technique, such as die cutting. Preferably, there are no appreciable gaps between the flexible members 22, such that bending the flexible members during purge dam installation does not allow an appreciable amount of purge gas to leave the weld zone 4 or air to enter the weld zone from within the pipes 8 and 10. It will be appreciated that other types of flexible members 22 may also be used.

The one or more plate members that form the purge dam 2 may further include one or more support plate members 26 that support the friction plate member 20 and provide structural rigidity. In the illustrated embodiment of FIGS. 1-3, there is one support plate member 26 on each side of the friction plate member 20. In other embodiments (not shown), there may be additional support members 26 on one or both sides of the friction member 20. The total number of support plate members 26 on each side of the friction member 20 need not necessarily be the same. The support plate members 26 have a periphery that may be aligned with a base of the friction disk flexible members 22. Because the pipe ends 12 and 14 are circular in cross section, the friction plate member 20 and the support plate members 26 are formed as generally circular disks. However, other shapes could be used if the purge dam is to be used in a welding structure other than a pipe, such as a rectangular duct. Both the friction plate member 20 and the support plate members 26 may each comprise structures that include one or more layers of the one or more water degradable materials, whether the materials be paper, board, film, molded structures, etc. The thickness of each plate member 20 and 26, as well as the total thickness of each purge dam 2, is a matter of design choice that will depend on various factors, including the size of the pipes 8 and 10 and the purge gas and air pressures that must be resisted by the purge dams.

The two purge dams 2 installed in the pipe assembly 6 establish what may be referred to as a weld zone purging installation. As can be seen in FIG. 2, the first purge dam 2 is arranged inside the first pipe end 12 of the first pipe 8, and the second purge dam 2 is arranged inside the second pipe end 14 of the second pipe 10. The friction plate members 20 of the first and second purge dams 2 respectively engage inside walls of the first and second pipe ends 12 and 14 in order to retain a purge gas (not shown) in the weld zone 4, and to prevent air from entering the weld zone from the first and second pipes 8 and 10. According to an example installation method, the first and second pipes 8 and 10 may be initially positioned such that the first and second pipe ends 12 and 14 are substantially spaced from each other to allow purge dam installation. The first purge dam 2 is arranged inside the first pipe end 12 at a selected first distance from the entrance thereof. Similarly, the second purge dam 2 is arranged inside the second pipe end 14 at a selected second distance from the entrance thereof. The first and second distances are selected to define a desired weld zone size when the first and second pipe ends 12 and 14 are arranged to form the root gap 16. If the purge dams 2 are to be positioned relatively deep within the pipe ends 12 and 14, a pushing implement (not shown) may be used to push the purge dams to the desired position. The pushing implement could be constructed in various ways. For example, it may have an elongated handle with an enlarged disk at the end to engage the purge dams 2. A more elaborate design could have a grasper or suction member in order to grasp the purge dams 2 and pull them back toward the pipe entrances in the event they are pushed in to far. A pushing implement could also be used if the diameter of the pipes 8 and 10 is smaller than the size of a finger. Once the purge dams 2 are properly positioned, the pipe ends 12 and 14 can be brought closer together until the root gap 16 is formed, thereby establishing the weld zone purging installation as shown in FIG. 2. Following welding, a purge dam deinstallation operation may be performed in which an aqueous material, such as water, is used to flush the purge dams 2 from the pipe assembly 6.

Accordingly, a water-degradable welding purge dam, together with a related method and a weld zone purging installation, have been disclosed. While various embodiments have been shown and described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A water-degradable welding purge dam for purging a weld zone of a pipe assembly comprising first and second pipes having respective first and second ends to be welded together at a root gap, said purge dam comprising:

a blocking plate comprising two or more plate members;

said two or more plate members including a friction plate member having a plurality of flexible members on its periphery adapted to flexibly engage an inside wall of one of said first or second pipe ends, such that said purge dam is self-retaining in said pipe assembly;

said two or more plate members, including said friction plate member and its flexible members, being substantially planar;

said two or more plate members including one or more substantially planar support plate members on one or both sides of said friction plate member to laterally support said friction plate member;

said one or more support plate members have an outer periphery that is aligned with a base of said flexible members; and said purge dam comprising one or more water degradable materials so that it can be flushed from said pipe assembly following welding.

2. The purge dam of claim 1, wherein said flexible members comprise flexible tabs defined by slits in said friction plate member periphery.

3. The purge dam of claim 1, wherein said purge dam is substantially flat.

4. The purge dam of claim 1, wherein said two or more plate members each comprise a generally circular disk.

5. The purge dam of claim 1, wherein said two or more plate members each comprise one or more layers of said one or more water degradable materials.

6. The purge dam of claim 1, wherein said one or more water degradable materials comprise water soluble paper or board.

7. The purge dam of claim 1, wherein said one or more water degradable materials comprise a water degradable polymer.

8. The purge dam of claim 1, wherein said one or more water degradable materials comprise both water soluble paper or board and a water degradable polymer.

9. A method for installing water-degradable purge dams in a weld zone of a pipe assembly comprising first and second pipes having respective first and second ends to be welded together at a root gap, said method comprising:

providing first and second water-degradable purge dams, each said purge dam comprising:

a blocking plate comprising one or more plate members;

said one or more plate members including a friction plate member having a plurality of flexible members on its periphery adapted to flexibly engage an inside wall of one of said first or second pipe ends, such that said purge dam is self-retaining in said pipe assembly; and said purge dam comprising one or more water degradable materials so that it can be flushed from said pipe assembly following welding;

installing said first and second purge dams in said pipe assembly such that:

(1) said first purge dam is arranged inside said first pipe end at a selected first distance from an entrance to said first pipe end;

(2) said second purge dam is arranged inside said second pipe end at a selected second distance from an entrance to said second pipe end;

(3) said first and second distance being selected to define a desired weld zone size when said first and second pipe ends are arranged to form said root gap;

(4) said friction plate members of said first and second purge dams respectively engaging an inside wall of said first and second pipe ends in order to retain a purge gas in said weld zone and to prevent air from entering said weld zone from said first or second pipes; and said first and second purge dams being installed so that said friction plate member, including said flexible members, are in a substantially planar configuration as said first and second purge dams respectively enter said first and second pipes, and so that said flexible members thereafter bend out of plane to the extent that said friction plate members interfere with an interior wall of said first and second pipes.

10. The method of claim 9, wherein said first purge dam and said second purge dam are respectively installed in said first and second pipe ends when said pipe ends are substantially spaced from each other allow said installation, said pipe ends being thereafter brought closer together until said root gap is formed.

11. The method of claim 9, further including a purge dam deinstallation operation in which an aqueous material is used to flush said first and second purge dams from said pipe assembly following said welding.

12. A water-degradable welding purge dam for purging a weld zone of a pipe assembly comprising first and second pipes having respective first and second ends to be welded together at a root gap, said purge dam comprising:

a blocking plate comprising two or more plate members;

said two or more plate members including a friction plate member having a plurality of flexible members on its periphery adapted to flexibly engage an inside wall of one of said first or second pipe ends, such that said purge dam is self-retaining in said pipe assembly;

said two or more plate members, including said friction plate member and its flexible members, being substantially planar;

said purge dam comprising one or more water degradable materials so that it can be flushed from said pipe assembly following welding;

said flexible members comprising flexible tabs defined by slits in said friction plate member periphery;

said two or more plate members including one or more substantially planar support plate members that support said friction plate member;

said two or more support plate members having an outer periphery that is aligned with a base of said friction disk flexible tabs;

said purge dam being substantially flat and said two or more plate members each comprising a generally circular disk;

said two or more plate members each comprising one or more layers of said one or more water degradable materials; and said one or more water degradable materials comprising water soluble paper, water degradable polymer, or a combination of water soluble paper and a water degradable polymer.

13. A method for installing water-degradable purge dams to establish a weld zone purging installation for purging a weld zone of a pipe assembly comprising first and second pipes having respective first and second ends to be welded together at a root gap, said method comprising:

providing first and second water-degradable purge dams, each said purge dam including:

(1) a blocking plate comprising one or more plate members;

(2) said one or more plate members including a friction plate member having a plurality of flexible members on its periphery adapted to flexibly engage an inside wall of one of said first or second pipe ends, such that said purge dam is self-retaining in said pipe assembly; and (3) said one or more plate members, including said friction plate member and its flexible members, being substantially planar;

said first and second purge dams each comprising one or more water degradable materials so that said purge dams can be flushed from said pipe assembly following welding;

installing said first and second purge dams in said pipe assembly such that:

(1) said first purge dam is arranged inside said first pipe end at a selected first distance from an entrance to said first pipe end;

(2) said second purge dam is arranged inside said second pipe end at a selected second distance from an entrance to said second pipe end;

(3) said first and second distance being selected to define a desired weld zone size when said first and second pipe ends are arranged to form said root gap;

(4) said friction plate members of said first and second purge dams respectively engage an inside wall of said first and second pipe ends in order to retain a purge gas in said weld zone and to prevent air from entering said weld zone from said first or second pipes; and (5) said flexible members of each friction plate member exerting radial forces on a respective one of said inside walls of said first and second pipe ends in order to develop longitudinal friction forces along said inside walls that oppose air or purge gas pressures without use of an adhesive to secure said flexible member to said inside walls.

* * * * *